Mar. 27, 1923.

P. BERGLOF

DIVIDED WASHER

Filed Aug. 14, 1922

1,450,014

INVENTOR.
PETER BERGLOF.
BY HIS ATTORNEY.

Patented Mar. 27, 1923.

1,450,014

UNITED STATES PATENT OFFICE.

PETER BERGLOF, OF ISANTI, MINNESOTA.

DIVIDED WASHER.

Application filed August 14, 1922. Serial No. 581,715.

*To all whom it may concern:*

Be it known that I, PETER BERGLOF, a citizen of the United States, residing at Isanti, in the county of Isanti and State of Minnesota, have invented certain new and useful Improvements in Divided Washers; and I do hereby declare the following to be a full, clear, and exact description of the invention, such as will enable others skilled in the art to which it appertains to make and use the same.

This invention relates to a washer structure and particularly to the structure of a split washer or one arranged in sections which open to permit the application of the washer to a shaft or other member from a lateral direction. It is frequently desired to insert such washers into a small space so that a very thin washer is necessary.

It is an object of this invention, therefore, to provide such a washer which can be easily and inexpensively made and which can be made of very thin dimensions.

It is a further object of the invention to provide such a washer having hinged sections, the free ends of which are provided with latching means forming a lock for holding the washer in closed position and also provided with means for preventing relative lateral movement of the sections.

These and other objects and advantages of the invention will be fully set forth in the following description made in connection with the accompanying drawings in which like reference characters refer to the same parts throughout the different views, and in which, Fig. 1 is a plan view of the washer;

Figure 1:
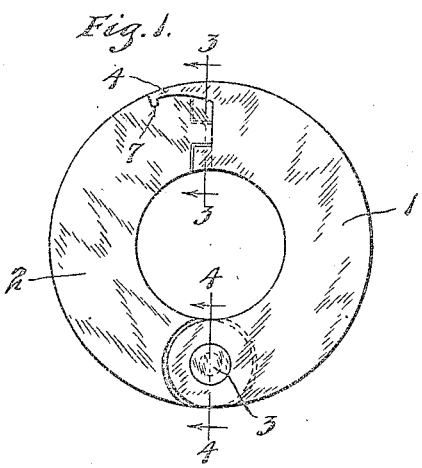
Figure 2:
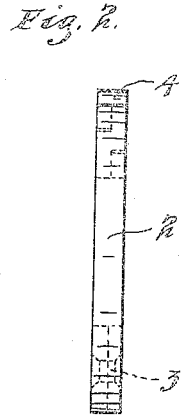
Fig. 2 is an edge view of the washer, as seen from the right of Fig. 1.
Figure 3:
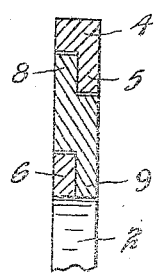
Fig. 3 is a vertical section on the line 3—3 of Fig. 1.
Figure 4:
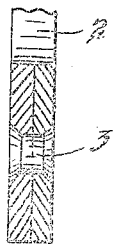
Fig. 4 is a vertical section on the line 4—4 of Fig. 1.

Referring to the drawings, a washer is shown of the usual annular shape, which washer is composed of two sections 1 and 2. It will be noted that the washer is quite thin and the sections 1 and 2 are rabbeted or provided with offset portions at their opposing ends and are connected by a rivet 3 forming the hinge pivot thereof. The recesses formed at the hinged ends, it will be noted, are provided with arcuate or curved sides concentric with the pivot 3 and substantially fitting the curved end of the adjacent section. The rabbeted or offset hinged portions of the sections are substantially one-half the width of the washer so that there is no increased thickness of the washer at its hinged portion.

The free end of the section 1 is provided with a forwardly extending latch member 4 having a short inwardly and radially projecting tongue at its forward end. Said latch 4 tapers somewhat toward its outer end, the inner surface thereof being formed on a curve. The free end of the section 1 is also provided with forwardly projecting tongues 5 and 6 which are radially offset and one of which projects from one side of the section and one from the other, the tongues being substantially one-half the thickness of the body portion of the washer.

The free end of the section 2 is formed with a recess, the curved outer edge of which substantially conforms to the curve of the inner side of the latch 4 and said recess has a notch 7 at one end into which the projection on latch 4 is adapted to engage, said free end being also provided with lateral recesses 8 and 9, which are radially offset and are of substantially half the thickness of the main portion of the washer. The recesses 8 and 9 are adapted to be engaged, respectively, by the tongues 5 and 6 when the washer is in closed position, as shown in Fig. 1.

Figure 5:
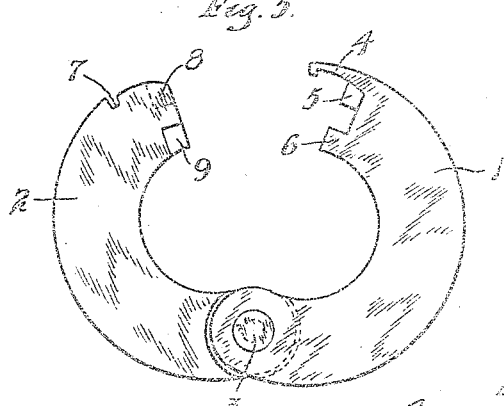
Fig. 5 is a plan view showing the washer in open position.

From the above description it is thought that the operation of the washer will readily be apparent. When it is desired to apply the same the washer will be opened to the position shown in Fig. 5. The same can then be applied to the shaft in a lateral direction and the sections then pressed to closed position. The end of the latch 4 will ride on the outer surface of the recess of section 2, and the projecting lip at the end of the latch 4 will snap into the recess 7 and hold the sections in locked relation. The tongues 5 and 6 will move, respectively, into the recesses 8 and 9 and the sections will thus be held from relative lateral movement.

From the above description it is seen that applicant has provided a very simple and a very efficient expansible slip washer. The applicant is aware that such washers have heretofore been made comprising peripheral slots with portions at each side of said slot. It will readily be observed, however, that with such a construction the provision of a very thin washer is impossible. By applicant's structure of having the tongues 5 and 6 offset to engage in recesses in the other section the washer can be made exceedingly thin. Furthermore, a simplified structure is produced. It will further be noted that the width of the latch 4 is substantially the entire width of the washer so that when the free ends are in locked position, as shown in Fig. 1, the periphery of the washer will be continuous, save for the division at the end of the latch. The washer can be quite easily and inexpensively made and forms quite an advance in the art.

It will, of course, be understood, that various changes may be made in the form, details and proportions of the parts without departing from the scope of applicant's invention, which, generally stated, consists in the matter shown and described and set forth in the appended claims.

What is claimed is:

1. A washer comprising two sections hinged at their ends, one of said sections having a recess adjacent its other end, the other section having a latch adjacent its free end engaging in said recess to form a lock and also having portions adjacent its free end disposed on each side of said end of said first mentioned section when the washer is in closed position.

2. The structure set forth in claim 1, said latch having its outer surface of the full width of the washer whereby when the washer is closed the periphery thereof at the free end of the sections is continuous, save for one transverse division.

3. A washer comprising two sections hinged at their opposing ends, one of said sections having a peripheral recess adjacent its free end and lateral recesses in its sides extending from its free end, the other section having a latch portion extending from its free end adapted to engage in said peripheral recess to form a lock and also having tongues projecting from its free end adapted to engage in said lateral recesses of the first mentioned section when the washer is in closed position.

4. The structure set forth in claim 3, the lateral recess in said first mentioned section, as well as the tongues in the second mentioned sections being radially offset.

5. A divided washer comprising relatively movable sections having interlocking ends, one of said ends having a recess therein, the other end having a latch adapted to engage in said recess to lock the ends together, said first mentioned end having portions at the sides thereof disposed at and contacting each side of said second mentioned end when the ends are in locked position.

In testimony whereof I affix my signature.

PETER BERGLOF.